United States Patent
Savagaonkar et al.

(10) Patent No.: US 8,645,704 B2
(45) Date of Patent: *Feb. 4, 2014

(54) PROTECTING CALLER FUNCTION FROM UNDESIRED ACCESS BY CALLEE FUNCTION

(75) Inventors: Uday Savagaonkar, Beaverton, OR (US); David Durham, Beaverton, OR (US); Ravi Sahita, Beaverton, OR (US); Subhash Gutti, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1134 days.

This patent is subject to a terminal disclaimer.

(21) Appl. No.: 11/745,399

(22) Filed: May 7, 2007

(65) Prior Publication Data

US 2008/0282358 A1 Nov. 13, 2008

(51) Int. Cl.
*G06F 21/00* (2013.01)

(52) U.S. Cl.
USPC .............................. 713/182; 713/162; 726/26

(58) Field of Classification Search
None
See application file for complete search history.

(56) References Cited

U.S. PATENT DOCUMENTS

| | | | | |
|---|---|---|---|---|
| 6,412,071 | B1 * | 6/2002 | Hollander et al. | 726/23 |
| 7,941,799 | B2 * | 5/2011 | Easton et al. | 718/1 |
| 2005/0010804 | A1 * | 1/2005 | Bruening et al. | 713/200 |
| 2006/0225135 | A1 * | 10/2006 | Cheng et al. | 726/26 |
| 2007/0150729 | A1 * | 6/2007 | Kirschner et al. | 713/162 |
| 2007/0180524 | A1 | 8/2007 | Choi et al. | |
| 2007/0204259 | A1 * | 8/2007 | Wilner et al. | 717/124 |
| 2008/0140968 | A1 | 6/2008 | Doshi et al. | |
| 2008/0148399 | A1 * | 6/2008 | Winkler | 726/22 |
| 2008/0162885 | A1 * | 7/2008 | Wang et al. | 712/214 |
| 2008/0280593 | A1 | 11/2008 | Savagaonkar | |

OTHER PUBLICATIONS

Tokura, "A microprogram Control Unit Based on a Tree Memory", Apr. 2007, Osaka University, p. 1-30.*
Non-Final Office Action received for U.S. Appl. No. 11/770,067, mailed on Jul. 22, 2010, 24 Pages.
Final Office Action received for U.S. Appl. No. 11/770,067, mailed on Feb. 3, 2011, 27 Pages.

* cited by examiner

*Primary Examiner* — Taghi Arani
*Assistant Examiner* — Gregory Lane
(74) *Attorney, Agent, or Firm* — Grossman, Tucker, Perreault & Pfleger, PLLC

(57) ABSTRACT

Disclosed is a method for restricting access of a first code of a plurality of codes of a first function from a second function. The method comprises calling the second function by the first function, addresses of the plurality of codes are stored in a stack page and colored in a first color (102). The method comprises performing access control check in a transition page for verifying whether the first function has permission to call the second function (104). Further the method comprises protecting the first code from the second function by coloring the addresses in a second color (106). Furthermore, the method comprises executing the second function by pushing addresses of the second function on the stack page, the addresses of the second function colored in a third color (108) and unprotecting the first code by coloring the addresses of the first code in the first color (110).

18 Claims, 8 Drawing Sheets

PROTECTING CALLER FUNCTION FROM UNDESIRED ACCESS BY CALLEE FUNCTION

FIELD

The present disclosure relates to page coloring techniques, and more particularly, to restricting access of the caller function from the callee function.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE DISCLOSURE

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient, but it is intended to cover the application or implementation without departing from the spirit or scope of the claims of the present disclosure. Also, it is understood that the phraseology and terminology used herein is for the purpose of description and should not be regarded as limiting.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

Figure 1:
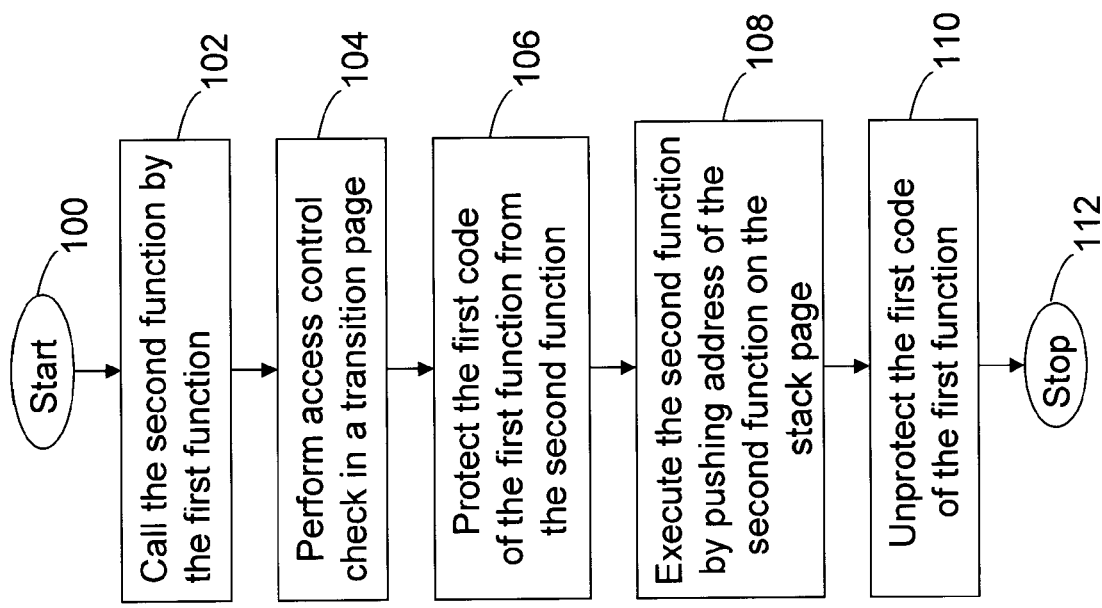
FIG. 1 shows a flowchart illustrating a method for restricting access of a first code of a plurality of codes of a first function from a second function, according to an exemplary embodiment of the present disclosure.

FIG. 1 is a flowchart illustrating a method for restricting access of a first code of a plurality of codes of a first function from a second function. The method is initiated at operation 100. At operation 102, the first function calls the second function, addresses of the plurality of codes of the first function are stored in a stack page and colored in a first color. The first function includes a plurality of codes including but not limited to private local variables, public variables or the like. In function calls, caller function and callee function share a same stack page, for example first function is a caller function and second function is a callee function. At operation 104, a transition page performs an access control check for verifying whether the first function has permission to call the second function. The access control check is performed by an access control function which will be described in detail in conjunction with FIG. 4. At operation 106, the first code of the first function is protected from the second function by coloring the addresses in a second color in the stack page. A caller protect function manipulates the stack page to color it in a manner such that all addresses on the stack page up to the callee function frame are colored in transcolor/second color. At operation 108, the second function is executed on the stack page, addresses of the second function are stored on the stack page and colored in a third color. Furthermore, there is return entry point on the transition page where the callee function/second function returns. A code at this entry point first calls the function to unprotect the first function and thereafter returns to the caller function/first function. The code is colored in the transcolor/second color, therefore there are no color violations. At operation 110, the first code of the first function is unprotected by coloring the addresses of the first code in the first color in the stack page. The method terminates at operation 112.

Figure 2:
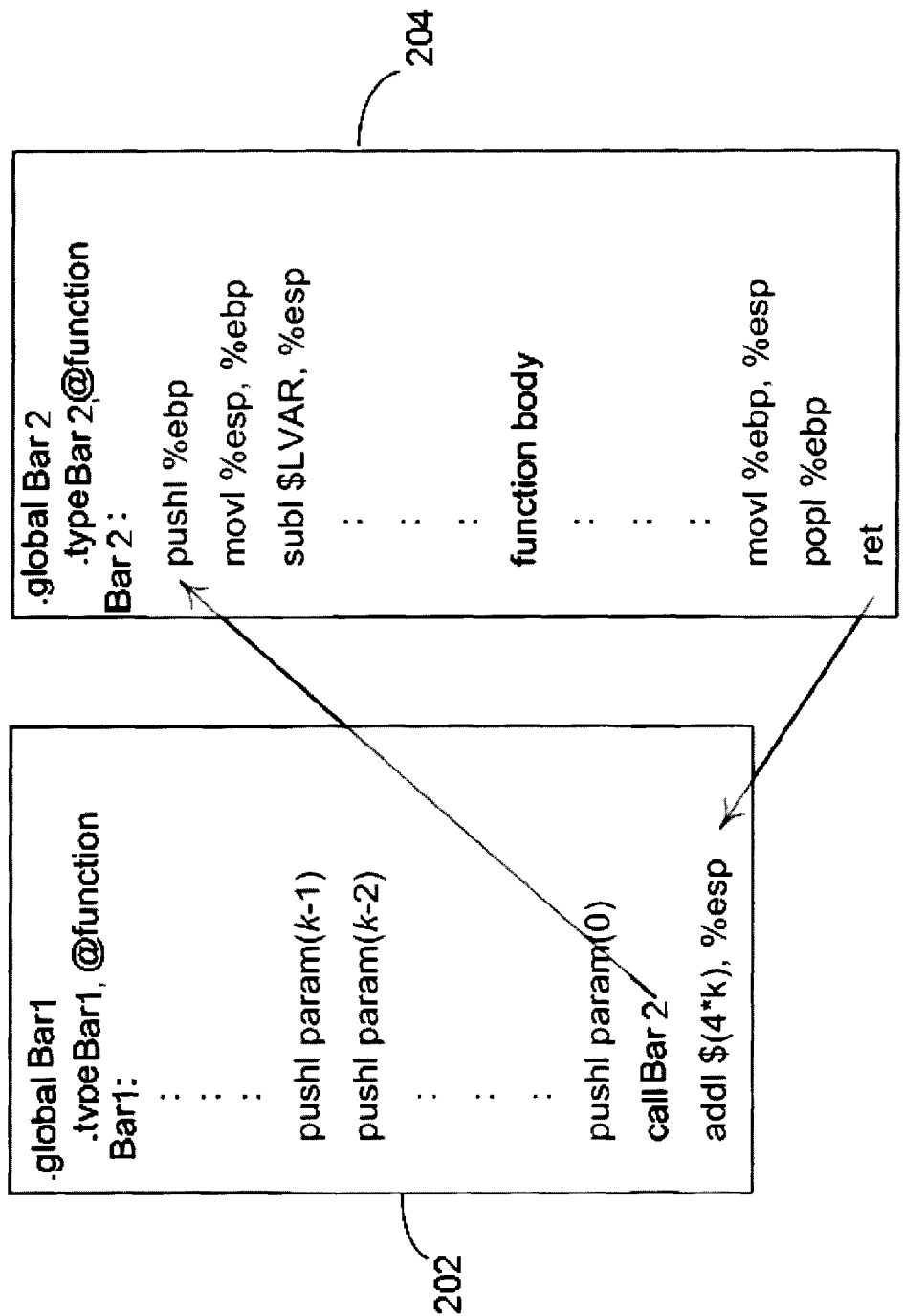
FIG. 2 is a block diagram illustrating a traditional method for handling function calls.

FIG. 2 is a block diagram illustrating a traditional method for handling function calls. The block 202 discloses the caller function/first function, for example bar1 ( ). The function bar1 ( ) pushes all the parameters onto the stack, for example param (k-1), param (k-2). Thereafter, the function bar ( ) calls the function bar2 ( ). The block 204 discloses the callee function/second function, for example bar2 ( ). The function bar2 ( ) pushes all the parameters on the stack. Thereafter, the control returns to the caller function. The parameter of the caller function are colored in the same color as the parameters of the callee function, thus the callee function can access the parameters of the caller function.

Figure 3:
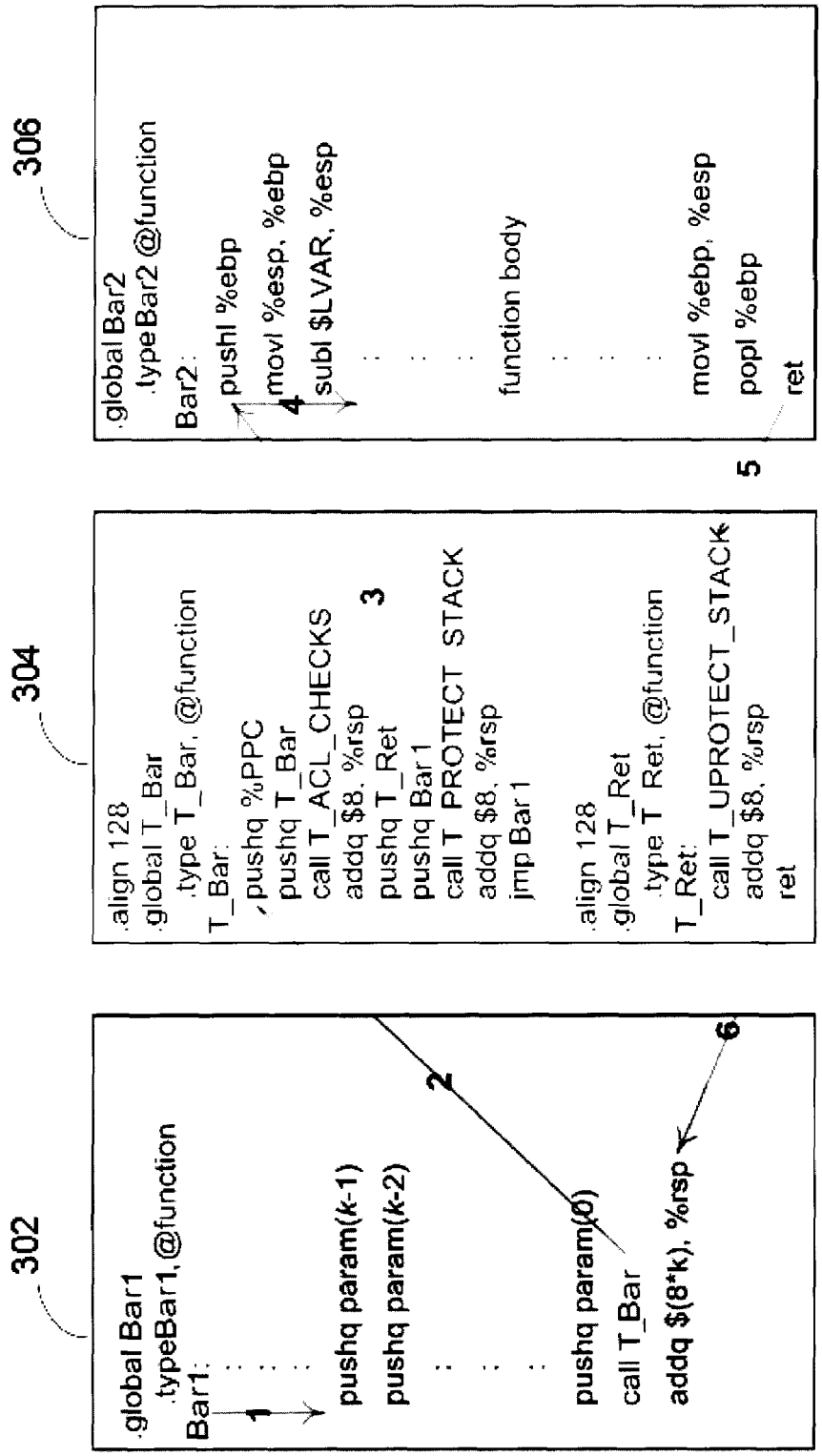
FIG. 3 is a block diagram illustrating a method for handling stack page using transition page, according to an exemplary embodiment of the present disclosure.

FIG. 3 is a block diagram for illustrating a method for handling stack page using the transition page. The block 302 is a caller page corresponding to the caller function/first function, for example function bar1 ( ). The block 306 is a callee page corresponding to the callee function/second function, for example bar2 ( ). The block 304 corresponds to the transition page. The block 302 is colored in the first color, the block 304 is colored in a special color (transcolor/second color) and the block 306 is colored in the third color. The transition page 304 can recolor any Parallel Page Table Entry (PPTE), which will be described in conjunction with FIG. 8. The transition page 304 can read/write to pages of any color and can jump in to pages of any color. Further, a code from page of any color can jump (or call, return, etc.) into the transition page 304, as long as the target address of the jump has a pre-specified alignment (e.g., 128 bytes). Interlacing of the call from the caller function to the callee function is done with the transition page 304.

An aligned address on the transition page 304 exposes an entry-point for inter-color calls. This entry point, on the other side, could be hooked to the callee function. When the caller function makes a call to the entry point, the code at the entry point can verify that the caller function has access rights, which is described in conjunction with FIG. 4, manipulate the stack page colors, described in conjunction with FIG. 5, pushes address of the Return Entry Point onto the stack page, and then jumps into the callee function. Since special privileges are provided to the transcolor of the transition page 304, therefore it does not cause any color violations.

In block 302, the caller function/first function, for example function bar1 ( ) pushes the parameters on the stack page, for example, param (k-1), param (k-2). Thereafter, the caller function jumps to the entry point on transition page 304. The transition page 304 performs Access Control List (ACL) checks for checking whether the caller function has permission to call the callee function which will be described in conjunction with FIG. 4. Thereafter, the PROTECT_STACK/caller protect function is called for protecting the first code of the first function/caller function from the second function/callee function, which will be described in conjunction with FIG. 5. The transition page 304 jumps into the callee function and executes a code of the callee function and returns to the return entry point. Thereafter, UNPROTECT_STACK/caller unprotect function is called for unprotecting the first code of the first function/caller function from the second function/callee function. Thereafter, the code at return entry point returns to the caller function.

Figure 4:
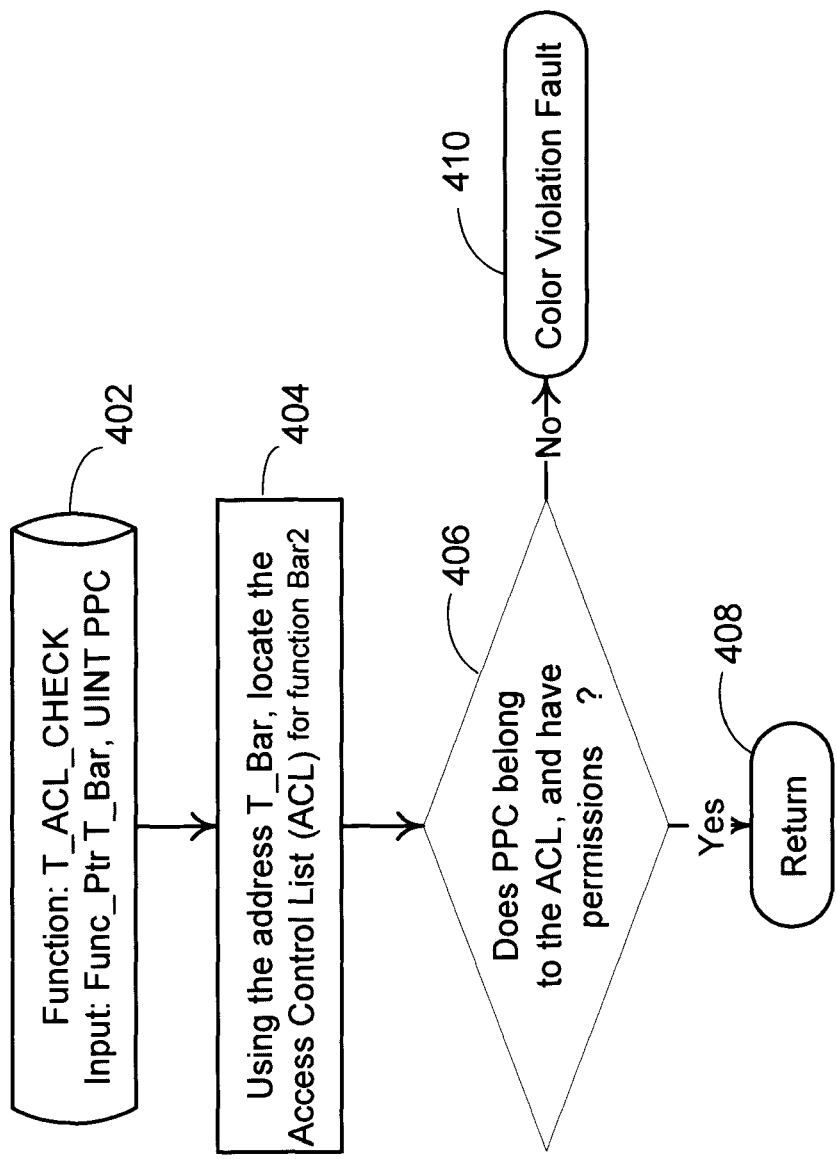
FIG. 4 illustrates a flowchart for performing Access Control List (ACL) check; according to an exemplary embodiment of the present disclosure.

FIG. 4 illustrates a flowchart for performing Access Control List (ACL) check. At operation 402, a function T_ACL_CHECK/access control function is called in the transition page 304. The input in the function T_ACL_CHECK is a pointer FUNC_Ptr T_Bar and Previous Page Color (PPC) of the first function/caller function/bar1 ( ). At operation 404, the ACL for the callee function, for example function bar2 ( ) is located. At operation 406, it is determined whether the PPC is present in the ACL. Further, it is also determined whether the PPC of the first function has permissions to call the second function. At operation 406, if the PPC of the first function is present in the ACL and has permissions to call the second function, then permission is granted and the first function can call the second function and the method terminates at operation 408. However, if the PPC is not present in the ACL or the PPC of the first function does not have the permission to call the second function, then a color violation fault is generated at operation 410. The processor issues a page-fault with the Color Violation (CV) bit in the page-fault error codes set (color-violation exception) whenever a code tries to improperly access a colored page. In order to prevent a page-fault in every inter-color transitioning, a Directed Access Vector (DAV) instruction is introduced. A valid jump (JMP) from a different color code has to always go to a DAV instruction. The DAV ensures that a program has been entered at an expected point through a well defined interface. A page-color transition will be always updated in a "previous page color" (PPC) register by the processor, which is used by the DAV to check for a valid transition. The DAV generates a color-violation exception whenever the transition is not a valid one.

To provide the legacy applications for running in a page-colored environment, they are not colored (or they are given the color 0). Any non-colored process will not be able to access a colored page, but they will be able to access the system services, which are awarded a special color (0xFF).

Figure 5:
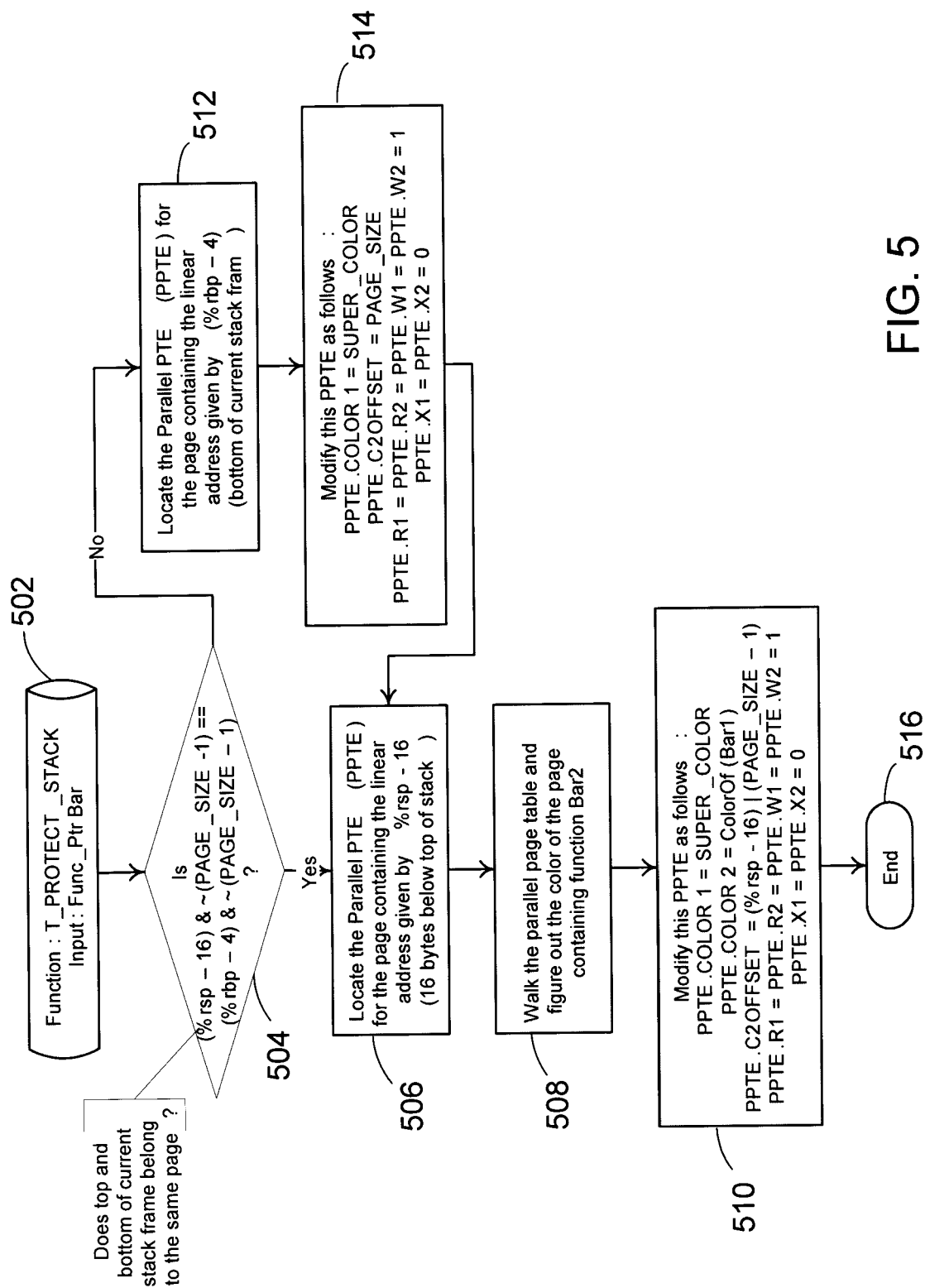
FIG. 5 illustrates a flowchart for protecting the first code of the first function from the second function, according to an exemplary embodiment of the present disclosure.

FIG. 5 illustrates a flowchart for protecting the first code of the first function/caller function from the second function/callee function. The first code of the first function, for e.g. private local variables are to be protected from access by the second function/callee function. The first function pushes the parameters on the stack page and control goes to the transition page, the ACL check is performed in the transition page 304 and thereafter the first code of the first function is protected by calling the T_PROTECT_STACK. At operation 502, a function T_PROTECT_STACK is called in the transition page 304, the input in the function T_PROTECT_STACK is a pointer Func_Ptr BAR. The Func_Ptr Bar is a pointer to the function bar2 ( )/second function/callee function. At operation 504, it is determined whether the top and bottom of stack frame belong to the same page. If the top and the bottom of stack frame belong to the same page, then at operation 506, a Parallel Page Table Entry (PPTE) is located for the stack page comprising the linear address %rsp-16. At operation 508, the parallel page is traversed to find the color of the page containing function bar2 ( ). At operation 510, the PPTE is modified, to color the PPTE such that all the addresses on the stack page, right up to the callee function/bar2 ( ) frame are colored in super color and all the addresses above the callee stack frame are colored in the callee color. Thereafter, the method is terminated at operation 516. However, if the top and bottom of the stack frame does not belong to the same page, then at operation 512, a PPTE is located for the stack page comprising the linear address %rbp-4. At operation 514, the PPTE is modified by coloring the PPTE such that all the addresses on the stack page, right up to the callee function/bar2 ( ) frame is colored in super color. Thereafter, the control goes to the operation 506.

Figure 6:
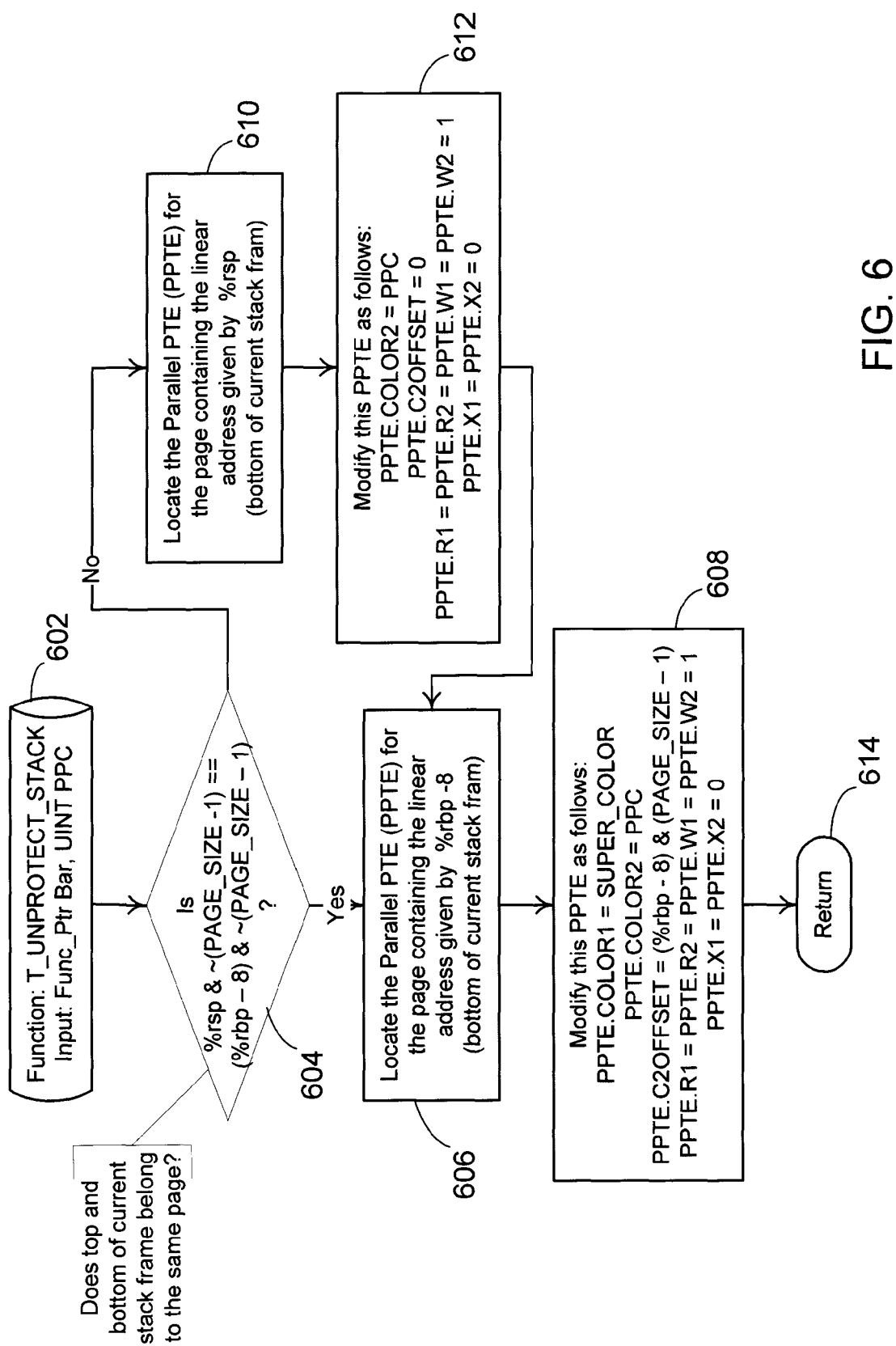
FIG. 6 illustrates a flowchart for unprotecting the first code of the first function, according to an exemplary embodiment of the present disclosure.

FIG. 6 illustrates a flowchart for unprotecting the first code of the first function. After the execution of the second function, the control returns back to the transition page 304. At operation 602, the transition page 304 calls the T_UNPROTECT_STACK function for unprotecting the stack page. The input in the function T_UNPROTECT_STACK is a pointer FUNC_Ptr Bar and PPC of the first function/caller function/bar1 ( ). The Func_Ptr Bar is a pointer to the function bar2 ( )/callee function/second function. At operation 604, it is determined whether the top and bottom of stack frame belong to the same page. If the top and the bottom of stack frame belong to the same page, then at operation 606, a Parallel Page Table Entry (PPTE) is located for the stack page comprising the linear address %rbp-8. At operation 608, the PPTE is modified, to color the PPTE such that all the addresses on the stack page in and above the caller function/bar1 ( ) frame are colored in the PPC of the first function/caller function and the frame below that is colored in the super color. Thereafter, the method is terminated at operation 614. However, if the top and bottom of the stack frame does not belong to the same page, then at operation 610, a PPTE is located for the stack page comprising the linear address %rsp. At operation 612, the PPTE is modified by coloring the PPTE such that all the addresses on the stack page in and above the caller function/bar1 ( ) frame is colored in the PPC of the first function/caller function. Thereafter, the control goes to operation 606.

Figure 7:
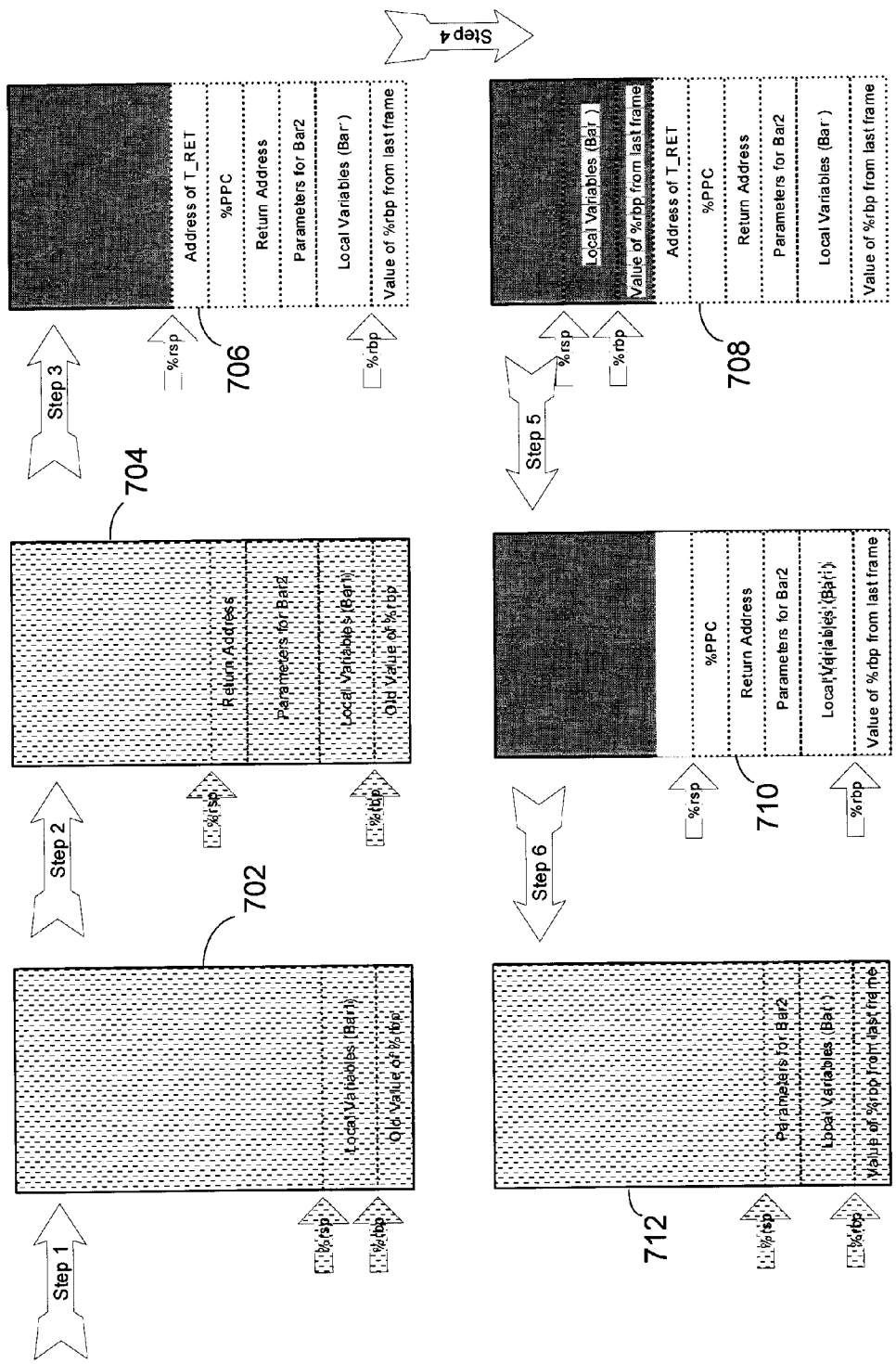
FIG. 7 is a block diagram for illustrating color changes on stack page, according to an exemplary embodiment of the present disclosure.

FIG. 7 is a block diagram for illustrating color changes on stack page. The block 702 represents the view of the stack page having local variables of the first function/caller function/bar1 ( ) on the stack page. The block 704 represents the stack page when the caller jumps to the entry point on the transition page 304. The parameters of the callee function are pushed on the stack page. At block 706, the stack page is protected by coloring the frame in and above the caller function frame till address of T_RET in a transcolor/super color, the frame above that is colored in the callee function/bar2 ( ) color. Since the frame is colored in the transcolor, the callee function cannot access the local variables of the caller function. Thereafter at block 708, local variables of the callee function/bar2 ( ) are pushed on the stack page. Further the value of %rbp from the last frame is pushed on the stack page. The callee function executes its code in the callee page 306.

At block 710, the value of %rbp is used and the %rbp now points to the value of the %rbp from the last frame on the bottom of the stack page and %rsp points to the PPC value stored on the stack page. Thereafter, at block 712, stack page is colored in the PPC of the first function/caller function. The stack page is colored in the PPC of the first function by using the PPC pushed on the stack page as shown in block 710.

The caller function may pass references of the private local variables to the callee function, with the callee function then modifying the private local variables of the caller function. However, since the private local variables of the caller are protected by transcolor as described in FIG. 5, such an access is not possible, therefore a separate parallel stack page is maintained, with the separate parallel stack page colored in the callee function color, The private local variable of the caller function whose references are to be passed to the callee function are defined on this parallel stack, instead of on the other stack. This is implemented, for example, in C Language by having a rule that the local variable whose pointer is ever used in the program could be passed to a callee by reference. This can be determined in a static analysis phase of the compiler.

Figure 8:
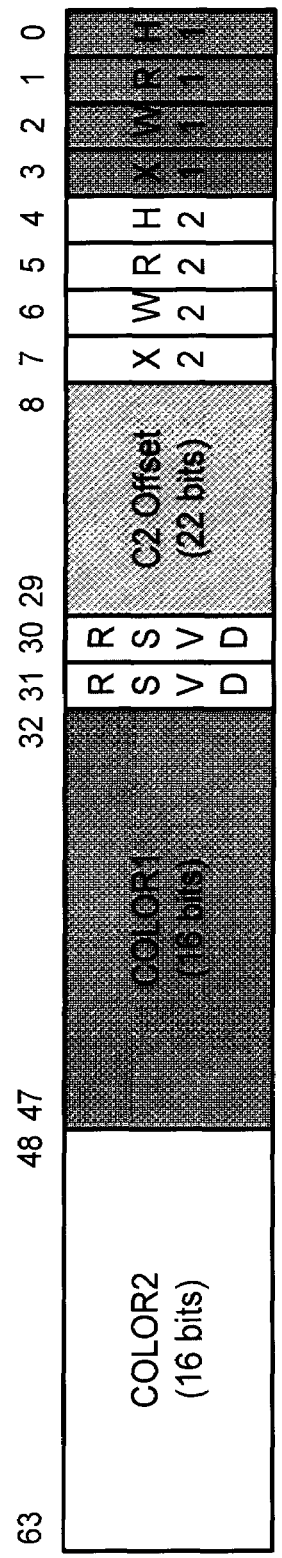
FIG. 8 is a format of a parallel page table entry, according to an exemplary embodiment of the present disclosure.

FIG. 8 is a format of the Parallel Page Table Entry (PPTE). FIG. 8 shows one possible structure of a parallel page-table entry (PPTE). A PPTE is a 64-bit structure with two sixteen-bit fields (COLOR1 and COLOR2) representing the two colors associated with the corresponding virtual page. The "C2 Offset" (22 bits) field indicates byte-offset into the page where COLOR1 ends and COLOR2 begins. The bit patterns corresponding to colors are stored in the two sixteen bit fields. The bit fields H1, R1, W1, and X1 represent hidden, read, write, and execute permissions on the COLOR1 part of the page, while H2, R2, W2, and X2 represent similar permissions on COLOR2 part of the page.

In the disclosure, the control flow from the caller function to the callee function passes through the transition page, which is colored in a special color, for example, transcolor or super color, and has permissions to modify the various fields of the PPTE, for example recolor the pages. The disclosure works by ensuring that the transition page colors the part of the page containing caller's stack in transcolor before entering the callee function, and restores the original colors before returning to the caller function.

As described above, the embodiments of the disclosure may be embodied in the form of computer-implemented processes and apparatuses for practicing those processes. Embodiments of the disclosure may also be in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the disclosure. The present disclosure can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the disclosure. When implemented on a general-purpose microprocessor, the computer program code segments configure the microprocessor to create specific logic circuits.

The foregoing descriptions of specific embodiments of the present disclosure have been presented for purposes of illustration and description. They are not intended to be exhaustive or to limit the disclosure to the precise forms disclosed, and obviously many modifications and variations are possible in light of the above teaching. The embodiments were chosen and described in order to best explain the principles of the disclosure and its practical application, to thereby enable others skilled in the art to best utilize the disclosure and various embodiments with various modifications as are suited to the particular use contemplated. It is understood that various omissions and substitutions of equivalents are contemplated as circumstance may suggest or render expedient, but it is intended to cover the application or implementation without departing from the spirit or scope of the claims of the present disclosure.

What is claimed is:

1. A method for restricting access of a first code of a plurality of codes of a first function from a second function, the method comprising:

calling the second function by the first function, wherein addresses of the plurality of codes of the first function are stored in a stack page in a memory device and colored in a first color;

passing control of an order of execution of instructions of the first and second functions to a transition page in a memory device, the transition page configured to receive a call from the first function to the second function and to set a Parallel Page Table Entry (PPTE), the PPTE having a first and at least a second field associated with the first function and the second function, respectively, the first and second field having a first and a second number of bits, respectively, configured to represent colors;

performing access control check via the transition page for verifying whether the first function has permission to call the second function;

protecting the first code of the first function from the second function via the transition page by setting the first number of bits of the first field of the PPTE to a second color;

executing the second function by pushing addresses of the second function on the stack page, the addresses of the second function colored in a third color by setting the second number of bits in the second field via the transition page to represent the third color; and unprotecting the first code of the first function via the transition page by setting the first number of bits of the first field of the PPTE to the first color;

wherein the addresses of the plurality of codes are colored in the first color, the second color and the third color by using bit patterns in the stack page.

2. The method of claim 1, further comprising a parallel stack page having addresses of a second code of the plurality of codes of the first function, the addresses of the second code colored in the third color, thereby enabling the second function to access the second code of the first function.

3. The method of claim 2, wherein the second code comprises reference of private local variables of the first function.

4. The method of claim 1, wherein the first code comprises private local variables of the first function.

5. The method of claim 1, wherein performing access control check comprises:

determining whether the first color of the first function is present in an access control list of the second function; and allowing the first function to call the second function based upon determining the first color of the first function present in the access control list of the second function.

6. The method of claim 1, wherein the stack page is shared dynamically between the first function and the second function.

7. The method of claim 1, wherein restricting access of the plurality of codes of the first function from the second function is used for preventing spread of viruses and worms.

8. A system for protecting a first code of plurality of codes of a caller function from a callee function, the system comprising:
   a stack page in a memory device capable of storing addresses of the plurality of codes of the caller function, the addresses colored in a first color;
   a transition page in a memory device comprising:
      an access control function for verifying whether the caller function has permission to call the callee function;
      a caller protect function for protecting the first code of the caller function via the transition page by setting the first number of bits of the first field of a Parallel Page Table Entry (PPTE) to a second color, the PPTE having a first and at least a second field associated with the caller function and the callee function, respectively, the first and second field having a first and a second number of bits, respectively, configured to represent colors; and
      a caller unprotect function for unprotecting the first code of the caller function via the transition page by setting the first number of bits of the first field of the PPTE to the first color;
      wherein the transition page is configured to receive a call from the caller function to the callee function, to control an order of execution of instructions of the caller and callee functions, and to set the PPTE; and
   a callee page capable of executing the callee function by pushing addresses of the callee function on the stack page, the addresses of the callee function colored in a third color by setting the second number of bits in the second field via the transition page to represent the third color;
   wherein the addresses of the plurality of codes are colored in the first color, the second color and the third color by using bit patterns in the stack page.

9. The system of claim 8, wherein the first code comprises private local variables of the caller function.

10. The system of claim 1, wherein access control function comprises instructions for:
    determining whether the first color of the caller function is present in an access control list of the callee function; and
    allowing the caller function to call the callee function upon determining the first color of the caller function is present in the access control list of the callee function.

11. A computer program product embodied on a non-transitory computer readable medium for restricting access of a first code of a plurality of codes of a first function from a second function, the computer program product comprising a program module having instructions for:
    calling the second function by the first function, wherein addresses of the plurality of codes of the first function are stored in a stack page and colored in a first color;
    passing control of an order of execution of instructions of the first and second functions to a transition page, the transition page configured to receive a call from the first function to the second function and to set a Parallel Page Table Entry (PPTE), the PPTE having a first and at least a second field associated with the first function and the second function, respectively, the first and second field having a first and a second number of bits, respectively, configured to represent colors;
    performing access control check via the transition page for verifying whether the first function has permission to call the second function;
    protecting the first code of the first function from the second function via the transition page by setting the first number of bits of the first field of the PPTE to a second color;
    executing the second function by pushing addresses of the second function on the stack page, the addresses of the second function colored in a third color by setting the second number of bits in the second field via the transition page to represent the third color; and
    unprotecting the first code of the first function via the transition page by setting the first number of bits of the first field of the PPTE to the first color;
    wherein the addresses of the plurality of codes are colored in the first color, the second color and the third color by using bit patterns in the stack page.

12. The computer program product of claim 11, further comprising a parallel stack page having addresses of a second code of the plurality of codes of the first function, the addresses of the second code colored in the third color, thereby enabling the second function to access the second code of the first function.

13. The computer program product of claim 12, wherein the second code comprises reference of private local variables of the first function.

14. The computer program product of claim 11, wherein the first code comprises private local variables of the first function.

15. The computer program product of claim 11, wherein performing access control check comprises:
    determining whether the first color of the first function is present in an access control list of the second function; and
    allowing the first function to call the second function based upon determining the first color of the first function present in the access control list of the second function.

16. The computer program product of claim 11, wherein the stack page is shared dynamically between the first function and the second function.

17. The computer program product of claim 11, wherein restricting access of the plurality of codes of the first function from the second function is used for preventing spread of viruses and worms.

18. A method for restricting access of a first code of a plurality of codes of a first function from a second function, the method comprising:
    calling the second function by the first function, wherein addresses of the plurality of codes of the first function are stored in a stack page and colored in a first color;
    passing control of an order of execution of instructions of the first and second functions to a transition page, the transition page configured to receive a call from the first function to the second function and to set a Parallel Page Table Entry (PPTE), the PPTE having a first and at least a second field associated with the first function and the second function, respectively, the first and second field having a first and a second number of bits, respectively, configured to represent colors;
    performing access control check via the transition page for verifying whether the first function has permission to call the second function;

protecting the first code of the first function from the second function via the transition page by setting the first number of bits of the first field of the PPTE to a second color;

executing the second function by pushing addresses of the second function on the stack page, the addresses of the second function colored in a third color by setting the second number of bits in the second field via the transition page to represent the third color; and unprotecting the first code of the first function via the transition page by setting the first number of bits of the first field of the PPTE to the first color;

wherein performing access control check further comprises:

determining whether the first color of the first function is present in an access control list of the second function; and allowing the first function to call the second function based upon determining the first color of the first function present in the access control list of the second function;

wherein determining whether the first color of the first function is present in the access control list further comprises:

checking a register for the first color, the register configured to contain a third number of bits associated with at least the first color of the first function; wherein the register is updated by the processor; and comparing the third number of bits to a list of colors in the access control list of the second function to determine whether the first color is present in the access control list.

* * * * *